Patented Oct. 14, 1941

2,258,708

UNITED STATES PATENT OFFICE 2,258,708

GLASS ARTICLE

Carl Martin Langkammerer, Wilmington, Del., assignor to E. I. du Pont de Nemours & Company, Wilmington, Del., a corporation of Delaware No Drawing. Application January 2, 1940, Serial No. 312,151

14 Claims. (Cl. 91—70)

This invention relates to the finishing of glass and more particularly to the coating of the same.

Because of its inherently excellent surface properties, glass has not, in general, been considered a material needing a protective covering. There are, however, certain fields wherein resin-coated glass has special utility including the application of colored resins to electric light bulbs, and the application of clear resins to flash bulbs to keep them from breaking when flashed or to glass building blocks to increase their adherence to bonding materials used in construction.

This invention has for its object the coating of glass surfaces with a hard, mar-resistant, transparent, resinous coating which is adherent not only when dry but also in the presence of water. A further object is the prevention of the reduction of toughness, by scratching, of tempered glass. Other objects will appear hereinafter.

These objects are accomplished by the following invention wherein a glass surface is coated with a priming coat of an alkyd resin and thereover with a heat-hardening phenol-aldehyde resin and then baking. Glass, coated with this finishing system, is hard and mar-resistant and the coating is adherent even in the presence of water.

A hard, adherent, resinous covering for glass surfaces is prepared by first coating the glass with a priming coat of an alkyd resin; then applying a layer of a heat-hardening phenol-formaldehyde condensation product to the hardened alkyd resin and baking.

The expression "alkyd resins" as employed herein has its usual meaning in the art, i. e., it designates resins formed by intermolecular condensation of a polyhydric alcohol with a polycarboxylic acid, as discussed in Carleton Ellis, The Chemistry of Synthetic Resins, 1935, vol II, pp. 862 et seq. The alkyd resins used in the process of this invention may be used as such or modified with other agents such as oils, drying oils, other resins, etc. Although any alkyd resin will give satisfactory results in the process of this invention, it is preferred to use resins which become infusible on heating, that is, resins obtained by condensing polycarboxylic acids with polyhydric alcohols having more than two hydroxyl groups.

The more detailed practice of the invention is illustrated by the following examples, wherein parts given are by weight. There are of course many forms of the invention other than these specific embodiments.

Example I

A 20 per cent solution in a 50–50 mixture of aliphatic and aromatic hydrocarbons of a glyceryl phthalate resin modified with approximately 35% of linseed oil and approximately 15% of China wood oil, and having an acid number of about 36, is flowed out on a clean soda-lime glass plate, such as ordinary window glass, and the plate allowed to drain and dry for several minutes at an angle of about 60° from the horizontal. The plate is then heated in an oven at 127° C. for one hour. After the coated panel has cooled to room temperature, a 50% solids solution in "Cellosolve" acetate of a phenol-formaldehyde resin, prepared by condensing one mole of diphenylolpropane with four moles of formaldehyde in the presence of sodium hydroxide as catalyst, is poured over the baked undercoat and the plate again allowed to drain and dry for several minutes at an angle of about 60° from the horizontal. The composite coating is then baked at 140° C. for one hour. A clear, glossy, strongly adherent finish is obtained which retains its adhesion in boiling water and which remains unchanged after 30 days' immersion in water at room temperature. By contrast a film of this phenol-formaldehyde resin when applied to the glass directly, can be peeled from the glass after soaking in water for one day. The coated glass prepared in this manner sometimes has a pale yellow tint but, baked in an inert atmosphere, such as carbon dioxide or nitrogen, it is invariably colorless.

Example II

A panel of borosilicate ("Pyrex") glass is given a basecoat of oil-modified alkyd resin identical with the one in Example I and the basecoat then covered with a 55% solution in normal butanol of a resin prepared by condensing phenol and formaldehyde at 100° C. using a small amount of sodium hydroxide as a catalyst. The whole is then baked for an hour at 140° C. to harden the topcoat. This panel is slightly more yellow than the one in Example I but otherwise has excellent physical properties and water resistance.

Example III

A 20% solution in a mixture of 4 parts of dioxane and 1 part of ethanol of an unmodified glyceryl phthalate resin prepared by condensing three moles of glycerol with two moles phthalic anhydride at about 200° C. for 20 minutes and having an acid number of 115 is flowed onto a pane of window glass and baked for an hour at 127° C. This is then given a topcoat of diphenylolpropane-formaldehyde resin identical with that in Example I and baked for an hour at 127° C. The sample prepared in this manner is colorless and has good water resistance.

*Example IV*

A soda-lime glass tumbler is dipped into a 20% solution in a mixture of 33 vols. of aromatic hydrocarbons and 67 volumes of aliphatic hydrocarbons of a glyceryl phthalate resin modified with 50% of soybean oil, allowed to drain, and then heated at 140° C. for one hour. It is then dipped into the topcoat solution of Example I, again allowed to drain, and baked for an hour at 140° C. Except for a pale yellow tint the coated tumbler has the same appearance as the original tumbler. The coated tumbler is satisfactory in regular kitchen service and withstands repeated washings with soap and water. Lamp bulbs may be coated in the same manner.

The process of the present invention is applicable to any solid, essentially water-insoluble, glass substrate. Thus, alkaline, neutral, lead, "Pyrex," lime, colored, tempered and etched glass, in flat panes, and in molded, blown, or spun shapes may be used. Glass fibers and fabrics can also be coated with this system.

While the examples show the use as undercoats of unmodified alkyd and fatty oil-modified alkyd resins, the invention is generically applicable to the use as undercoats for phenolaldehyde resins in glass coatings of alkyd resins in general including alkyds modified by blending with other resins such as urea-formaldehyde, pyroxylin, chlorinated rubber, phenol-formaldehyde resins, etc. Pigmented alkyds can likewise be used to obtain opaque and colored surfaces. In place of the usual glycerol and phthalic anhydride, the alkyd resin can be produced from other polyhydric alcohols such as ethylene and hexamethylene glycol, pentaerythritol, diethylene glycol, sorbitol, 1,1,1-trimethylolpropane, castor oil and mannitol, and from other polybasic acids or anhydrides such as adipic, succinic, sebacic, terephthalic, isophthalic, maleic, fumaric, itaconic, malic, citric, camphoric, and diphenic acids. The alkyd resins may be manufactured or modified by any of the methods known in the art, for example, (1) by fusion of a mixture of a polyhydric alcohol and polybasic acid, (2) by fusion of a polyhydric alcohol, polybasic acid, and fatty oil acid, (3) by fusion of a fatty oil with glycerine to form the mono- or diglyceride followed by fusion with a polybasic acid, or (4) by the solution method described in U. S. 2,057,765. The undercoat may be applied by brushing, dipping, or spraying and in the case of oil-modified materials a drier may or may not be included. The temperature and time for which the basecoat should be baked may vary over wide limits, but at temperatures below 100° C. the resins set up slowly and at temperatures above 150° C. darkening of the film takes place. In the case of drying oil alkyds containing drier no bake is required if the coat is allowed to dry at room temperature for a sufficient length of time. An improved color is obtained by baking in an inert atmosphere such as carbon dioxide, nitrogen, or hydrogen. The undercoat may vary greatly in thickness, but best results have been obtained with thin undercoats of the order of 0.0001 inch thick. Any solvent in which the resin will dissolve is suitable as a medium of application. The preferred undercoat is a linseed oil-China-wood oil modified alkyd resin, e. g., a 34.7% linseed oil-13.9% China-wood oil-51.4 phthalic glyceride resin.

The examples disclose the preferred topcoating, namely phenol-formaldehyde resin, but the invention is applicable to phenol-aldehyde resin coatings broadly. Of the phenol-formaldehyde resins tested, the heat-hardening type has been found most suitable. The most satisfactory topcoat from the standpoint of color, hardness, appearance and the like, is the resin formed by condensing diphenylolpropane and formaldehyde. As phenolic components, such compounds as phenol, m-cresol, resorcinol, m-chlorophenol, 1,3,5-xylenol, and dibasic dinuclear phenols such as diphenylolpropane, diphenylolcyclohexane, diphenylolsulfone, dihydroxydiphenyl can be used. In the condensation with these phenols, other aldehydes, for example, acetaldehyde, furfuraldehyde, butyraldehyde or benzaldehyde may be used in place of formaldehyde.

The phenol-formaldehyde resin can be prepared by any of the known methods of making those resins, e. g., according to U. S. 1,225,748, or U. S. 1,614,172. Either acid or basic condensing agents are suitable. The resin-forming condensation can be carried out at room temperature or at elevated temperatures. The resin from diphenylolpropane is prepared in aqueous solution by condensing one mol of this phenol with four moles of formaldehyde in the presence of two moles of sodium hydroxide. The condensation has proceeded to the proper point after four days at room temperature and the resin is isolated by neutralizing the reaction mixture, washing with water, and evaporating the excess water in a vacuum. The use of only catalytic amounts of alkali and of higher temperatures is also satisfactory. The topcoat may be put on from any solvent for the resin, by brushing, dipping or spraying. It should be baked in air or in an inert atmosphere at a temperature above 100° C. and below 200° C. for ten minutes to an hour to bring out the best film properties. A coat 0.001–0.003 inch thick has given the best results as far as water resistance is concerned.

The coating system described herein finds application in protecting the surface of glass from marring or deterioration. It can be used to prevent the scratching and subsequent reduction in toughness of "tempered" or otherwise toughened glass articles. It is also useful in coloring or modifying the appearance of glass articles. Colored electric light bulbs may be prepared using this coating system. Glass building blocks coated in this manner have better adherence for bonding materials and therefore simplify the use of glass building blocks in construction.

Adhesion to glass, particularly in the presence of water, is a property which is perhaps the most difficult to attain satisfactorily with resin coatings. The finishing system of the present invention is outstanding in this respect, as window glass or "Pyrex" glass plates coated according to the present invention with an alkyd resin undercoat and a phenol-aldehyde resin topcoat remain unchanged after soaking in water at room temperature for as much as 45 days and show no change even after two hours in hot soap suds (5% "Ivory" soap at 65° C.), whereas the best other resin coating tested began to blister after four days in water at room temperature. Finishes according to the present invention are, after baking, insoluble in practically all organic solvents, for example, benzene, toluene, dioxan, ethyl acetate, acetone, kerosene, lubricating oil, acetic acid, and ethylene glycol.

Moreover, the phenol-formaldehyde-alkyd finish is hard and abrasion-resistant. It has good color, a glossy surface, and is glass-like in appearance. For use on household glassware, it has an advantage over most other coating systems in that water drains from it readily.

The above description and examples are intended to be illustrative only. Any modification of or variation therefrom which conforms to the spirit of the invention is intended to be included within the scope of the claims.

What is claimed is:

1. Process of providing a glass surface having a highly water-resistant coating thereon which comprises coating said glass surface with a coating composition having as essentially its sole film-forming component an alkyd resin, applying thereover a coating composition having as essentially its sole film-forming component a phenol-aldehyde resin and baking.

2. Process of providing a glass surface having a highly water-resistant coating thereon which comprises coating said glass surface with a coating composition having as essentially its sole film-forming component an alkyd resin, applying thereover a coating composition having as essentially its sole film-forming component a phenol-formaldehyde resin and baking.

3. Process of providing a glass surface having a highly water-resistant coating thereon which comprises coating said glass surface with a coating composition having as essentially its sole film-forming component an alkyd resin, applying thereover a coating composition having as essentially its sole film-forming component a diphenylolpropane-formaldehyde resin and baking.

4. Process of providing a glass surface having a highly water-resistant coating thereon which comprises coating said glass surface with a coating composition having as essentially its sole film-forming component a phthalic glyceride resin, applying thereover a coating composition having as essentially its sole film-forming component a diphenylolpropane-formaldehyde resin and baking.

5. Process of providing a glass surface having a highly water-resistant coating thereon which comprises coating said glass surface with a coating composition having as essentially its sole film-forming component a linseed oil and China wood oil modified phthalic glyceride resin, applying thereover a coating composition having as essentially its sole film-forming component a diphenylolpropane-formaldehyde resin and baking.

6. A glass surface having a coating thereon wherein the film-forming component is essentially an alkyd resin and thereover a coating wherein the film-forming component is essentially a baked phenol-aldehyde resin.

7. A glass surface having a coating thereon wherein the film-forming component is essentially an alkyd resin and thereover a coating wherein the film-forming component is essentially a baked phenol-formaldehyde resin.

8. A glass surface having a coating thereon wherein the film-forming component is essentially a phthalic glyceride resin and thereover a coating wherein the film-forming component is essentially a baked phenol-formaldehyde resin.

9. A glass surface having a coating thereon wherein the film-forming component is essentially a phthalic glyceride resin and thereover a coating wherein the film-forming component is essentially a baked diphenylolpropane-formaldehyde resin.

10. A glass surface having a coating thereon wherein the film-forming component is essentially a linseed oil and China wood oil phthalic glyceride resin and thereover a coating wherein the film-forming component is essentially a baked diphenylolpropane-formaldehyde resin.

11. A sheet of window glass having a coating thereon, the film-forming component of which is essentially an alkyd resin and thereover a baked coating, the film-forming component of which is essentially a phenol-formaldehyde resin.

12. A sheet of window glass having a coating thereon, the film-forming component of which is essentially a phthalic glyceride resin and thereover a baked coating, the film-forming component of which is essentially a diphenylolpropane-formaldehyde resin.

13. A glass tumbler having a coating thereon, the film-forming component of which is essentially an alkyd resin and thereover a baked coating, the film-forming component of which is essentially a phenol-formaldehyde resin.

14. A glass tumbler having a coating thereon, the film-forming component of which is essentially a phthalic glyceride resin and thereover a baked coating, the film-forming component of which is essentially a diphenylolpropane-formaldehyde resin.

CARL MARTIN LANGKAMMERER.